(12) United States Patent
Wang et al.

(10) Patent No.: US 10,353,127 B2
(45) Date of Patent: Jul. 16, 2019

(54) SMALL-PITCH WIRE GRID POLARIZER

(71) Applicant: Moxtek, Inc., Orem, UT (US)

(72) Inventors: Bin Wang, Lindon, UT (US); Hua Li, Lindon, UT (US); Brian Bowers, Kaysville, UT (US)

(73) Assignee: Moxtek, Inc., Orem, UT (US)

( * ) Notice: Subject to any disclaimer, the term of this patent is extended or adjusted under 35 U.S.C. 154(b) by 0 days.

(21) Appl. No.: 15/948,770

(22) Filed: Apr. 9, 2018

(65) Prior Publication Data

US 2018/0224590 A1 Aug. 9, 2018

Related U.S. Application Data

(62) Division of application No. 15/195,602, filed on Jun. 28, 2016, now abandoned.

(60) Provisional application No. 62/209,131, filed on Aug. 24, 2015.

(51) Int. Cl.
| | |
|---|---|
| *G02B 5/30* | (2006.01) |
| *G02B 6/136* | (2006.01) |
| *G02B 5/18* | (2006.01) |
| *G02B 5/00* | (2006.01) |
| *G02B 17/00* | (2006.01) |
| *G02B 26/00* | (2006.01) |

(52) U.S. Cl.
CPC ............ *G02B 5/3058* (2013.01); *G02B 5/00* (2013.01); *G02B 5/1857* (2013.01); *G02B 6/136* (2013.01); *G02B 17/00* (2013.01); *G02B 26/00* (2013.01)

(58) Field of Classification Search
CPC ...... G02B 5/3058; G02B 26/00; G02B 17/00; G02B 5/00; G02B 5/1857; G02B 6/136
See application file for complete search history.

(56) References Cited

U.S. PATENT DOCUMENTS

| | | |
|---|---|---|
| 3,291,871 A | 12/1966 | Francis |
| 5,991,075 A | 11/1999 | Katsuragawa et al. |
| 6,122,103 A | 9/2000 | Perkins et al. |
| 6,288,840 B1 | 9/2001 | Perkins et al. |
| 6,665,119 B1 | 12/2003 | Kurtz et al. |
| 7,630,133 B2 | 12/2009 | Perkins |
| 7,692,860 B2 | 4/2010 | Sato et al. |
| 7,800,823 B2 | 9/2010 | Perkins |
| 7,961,393 B2 | 6/2011 | Perkins et al. |
| 8,426,121 B2 | 4/2013 | Brueck et al. |

(Continued)

OTHER PUBLICATIONS

D.C. Flanders, "Application of 100 Å linewidth structures fabricated by shadowing techniques", J. Vac. Sci. Technol., 19(4), Nov./Dec. 1981.

(Continued)

*Primary Examiner* — Duy Vu N Deo
(74) *Attorney, Agent, or Firm* — Thorpe, North & Western, LLP

(57) ABSTRACT

The wire grid polarizer (WGP) comprises an array of parallel, elongated nanostructures located over a surface of a transparent substrate and a plurality of spaces, including a space between adjacent nanostructures. Each of the nanostructures can include (1) a plurality of parallel, elongated wires located on the substrate, including an inner-pair located between an outer-pair; (2) lateral-gaps between each wire of the outer-pair and an adjacent wire of the inner-pair; (3) and a center-gap between the two wires of the inner-pair.

20 Claims, 15 Drawing Sheets

(56) References Cited

U.S. PATENT DOCUMENTS

| | | |
|---|---|---|
| 8,611,007 B2 | 12/2013 | Davis |
| 8,913,321 B2 | 12/2014 | Davis |
| 2008/0055723 A1 | 3/2008 | Gardner et al. |
| 2009/0041971 A1 | 2/2009 | Wang et al. |
| 2009/0053655 A1 | 2/2009 | Deng et al. |
| 2012/0250154 A1 | 10/2012 | Davis |
| 2013/0084688 A1* | 4/2013 | O'Meara ............ H01L 21/0337 438/478 |
| 2013/0258471 A1 | 10/2013 | Davis |
| 2014/0024209 A1* | 1/2014 | Jung ............... H01L 21/823456 438/595 |
| 2014/0300964 A1 | 10/2014 | Davis et al. |
| 2015/0077851 A1 | 3/2015 | Wang et al. |
| 2015/0116825 A1 | 4/2015 | Wang et al. |
| 2015/0116824 A1 | 5/2015 | Wang et al. |
| 2015/0131150 A1 | 5/2015 | Probst et al. |
| 2015/0226897 A1 | 8/2015 | Kim et al. |
| 2018/0113975 A1* | 4/2018 | Sherazi ............... G06F 17/5077 |

OTHER PUBLICATIONS

D.C. Flanders, "Submicron periodicity gratings as artificial anisotropic dielectrics", Appl. Phys. Lett. 42 (6), Mar. 15, 1983.

* cited by examiner

SMALL-PITCH WIRE GRID POLARIZER

CLAIM OF PRIORITY

This is a divisional of U.S. Nonprovisional patent application Ser. No. 15/195,602, filed on Jun. 28, 2016, which claims priority to U.S. Provisional Patent Application No. 62/209,131, filed on Aug. 24, 2015, which are hereby incorporated herein by reference in their entirety.

FIELD OF THE INVENTION

The present application is related generally to wire grid polarizers.

BACKGROUND

Wire grid polarizers (WGPs or WGP for singular) may be used for polarizing light, by allowing one polarization of light to pass through the polarizer, and reflecting or absorbing an opposite polarization of light. For simplicity, the polarization that primarily passes through the polarizer will be hereafter referred to as p-polarized light and the polarization that is primarily reflected or absorbed will be hereafter referred to as s-polarized light. Goals of WGP design include increasing transmission of p-polarized light, decreasing transmission of s-polarized light, and increasing reflection or absorption of s-polarized light. Different applications have different requirements.

The goals of increasing transmission of p-polarized light and decreasing transmission of s-polarized light are common to most or all applications. There can be a trade-off between these two. In other words, certain designs that may increase transmission of p-polarized light may also undesirably increase transmission of s-polarized light. Other designs that decrease transmission of s-polarized light may also undesirably decrease transmission of p-polarized light.

For some applications, it is desirable to reflect as much s-polarized light as possible so that both polarized light beams can be effectively utilized. It can be important in such designs to increase reflection of s-polarized light without reducing transmission of p-polarized light. Sometimes there is a trade-off in a particular design between increasing transmission of p-polarized light and increasing reflection of s-polarized light.

For other applications, absorption of s-polarized light may be preferred, such as for example if reflection of light can disrupt the image or other intended use. In a transmissive panel image projection system, reflected light may go back into the LCD imager causing image degradation, or stray light can reach the screen, degrading contrast. An ideal selectively absorptive WGP will transmit all p-polarized light and selectively absorb all s-polarized light. In reality, some s-polarized light is transmitted and some reflected and some p-polarized light is absorbed and some reflected. Sometimes there is a trade-off in a particular design between increasing transmission of p-polarized light and increasing absorption of s-polarized light.

The effectiveness of a WGP can thus be quantified by (1) high transmission of p-polarized light; (2) high contrast; and (3) depending on the design, high absorption or reflection of s-polarized light. Contrast is equal to percent of p-polarized light transmitted (Tp) divided by percent of s-polarized light transmitted (Ts): Contrast=Tp/Ts.

It can be important in WGPs for infrared, visible, and ultraviolet light to have wires with small width and pitch, such as nanometer or micrometer width and pitch, for effective polarization. Typically, a pitch of less than half of the wavelength of light to be polarized is needed for effective polarization. Smaller pitches may improve the contrast. Thus, small pitch can be an important feature of WGPs. Manufacture of WGPs with sufficiently small pitch is challenging and is a goal of research in this field.

SUMMARY

It has been recognized that it would be advantageous to provide wire grid polarizers (WGPs or WGP for singular) with small pitch and desired performance. The present invention is directed to various embodiments of, and methods of making, WGPs that satisfy these needs. Each embodiment may satisfy one, some, or all of these needs.

A method of making a WGP can include some or all of the following steps:
  providing an array of parallel, elongated support ribs located over a transparent substrate and spaces between the support ribs, the spaces being solid-material-free;
  conformal coating the substrate and the support ribs with a first-layer while maintaining solid-material-free at least a portion of the spaces between the support ribs;
  etching the first-layer to remove horizontal segments and leaving an array of inner-pairs of parallel, elongated wires along sides of the support ribs, each wire of each inner-pair being separate from the other wire of the inner-pair;
  conformal coating the substrate and the support ribs with a second-layer while maintaining solid-material-free at least a portion of the spaces between the support ribs;
  etching the second-layer to remove horizontal segments and leaving middle-pairs, the middle-pairs being an array of parallel, elongated wires, each wire of each middle-pair being separated from the other wire of the middle-pair by wires of the inner-pair;
  conformal coating the substrate and the support ribs with a third-layer while maintaining solid-material-free at least a portion of the spaces between the support ribs;
  etching the third-layer to remove horizontal segments and leaving outer-pairs, the outer-pairs being an array of parallel, elongated wires along sides of the support ribs, each wire of each outer-pair being: spaced apart with respect to the other wire of the outer-pair; and spaced apart with respect to wires of the inner-pair by wires of a middle-pair, the wires of the middle-pair being formed of material of the second-layer; and
  etching the support ribs and the middle-pair to form: lateral-solid-material-free-regions between at least a portion of each wire of each outer-pair and at least a portion of an adjacent wire of the inner-pair; and center-solid-material-free-regions between at least a portion of the two wires of each inner-pair.

BRIEF DESCRIPTION OF THE DRAWINGS

FIG. 4 can be followed by FIG. 5 or by FIG. 22. FIG. 22 can be followed by FIG. 5. FIG. 5 can be followed by FIG. 6 or by FIG. 18. FIG. 8 can be followed by FIG. 9, FIG. 13, or FIG. 25.

FIGS. 10-17, 20-21, 23-24, and 29 show schematic cross-sectional side views of WGPs, in accordance with embodiments of the present invention. The WGPs can have multiple nanostructures 14. Each of the nanostructures can include a plurality of parallel, elongated wires 13, including an inner-pair $13_i$ located between an outer-pair $13_o$. There can be lateral-gaps $G_L$ between each wire of an inner-pair $13_i$ and an adjacent wire of an outer-pair $13_o$; center-gaps $G_c$ between the two wires of each inner-pair $13_i$; and spaces S between adjacent nanostructures 14.

In FIGS. 10-12, a thickness of center-solid-material-free-regions $R_c$ can be the same, or close to, a thickness of inter-nanostructure solid-material-free-regions $R_I$. In FIGS. 13-17, the inner-pair $13_i$ and the outer-pair $13_o$ can be located over base-ribs 12. In FIGS. 20-21, a thickness $Th_i$ of the inner-pair $13_i$ can be greater than a thickness $Th_o$ of the outer-pair $13_o$. In FIGS. 23-24, a thickness $Th_i$ of the inner-pair $13_i$ can be less than a thickness $Th_o$ of the outer-pair $13_o$. In FIG. 29, the plurality of parallel, elongated wires 13 also includes a second-outer-pair $13_{o2}$ which sandwich the outer-pair $13_o$ and the inner-pair $13_i$.

DEFINITIONS

Figure 1:
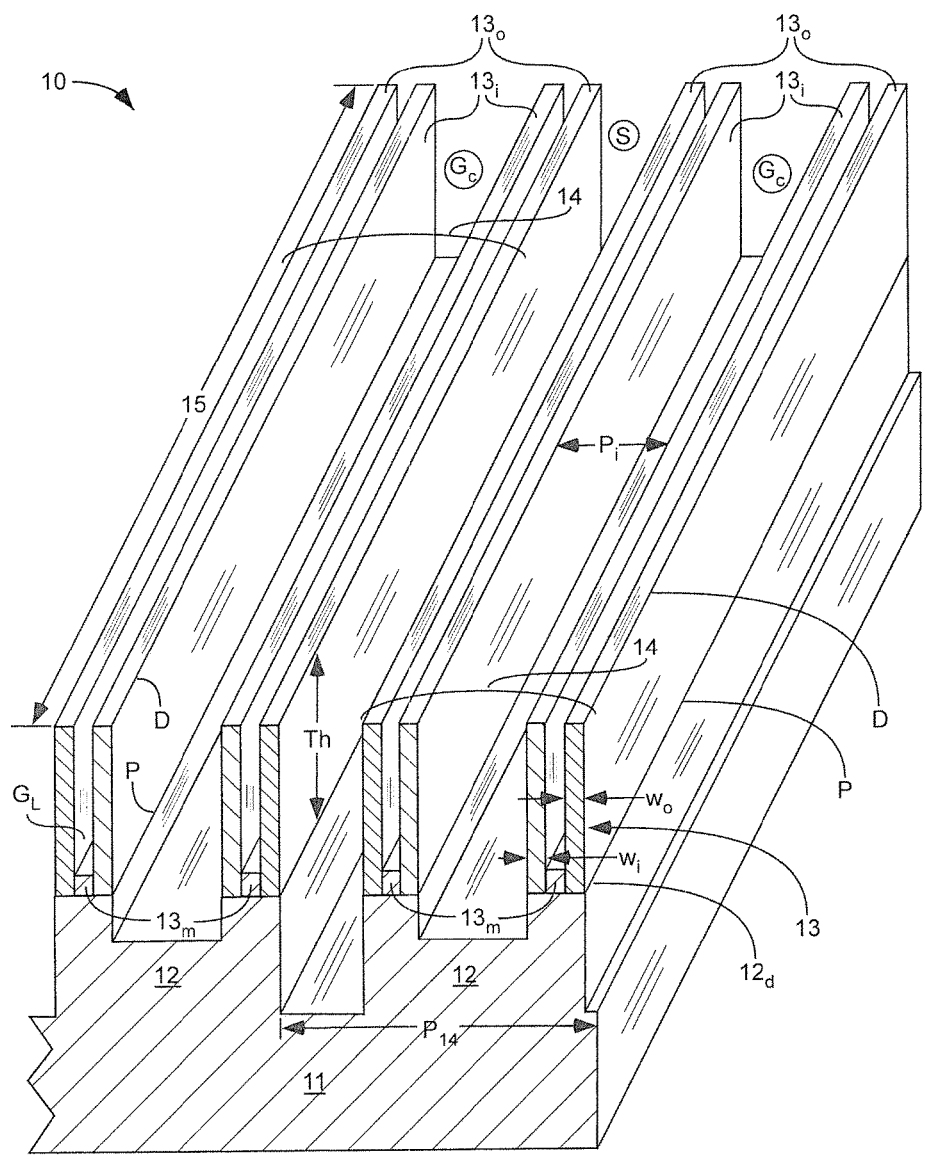
FIG. 1 is a schematic perspective view of a wire grid polarizer (WGP or WGPs for plural) 10 with nanostructures 14, each nanostructure 14 including a plurality of parallel, elongated wires 13 located on a distal-surface $12_d$ of a base-rib 12, the wires 13 including an inner-pair $13_i$, a middle-pair $13_m$, and an outer-pair $13_o$, in accordance with an embodiment of the present invention.

As used herein, the term "light" means electromagnetic radiation in the x-ray, ultraviolet, visible, and infrared regions of the electromagnetic spectrum.

As used herein, the term "substrate" includes a base material, such as for example a glass wafer. The term "substrate" includes a single material, and also includes multiple materials, such as for example a glass wafer with at least one thin film.

Many materials used in optical structures absorb some light, reflect some light, and transmit some light. The following definitions are intended to distinguish between materials or structures that are primarily absorptive, primarily reflective, or primarily transparent.

1. As used herein, the term "absorptive" means substantially absorptive of light in the wavelength of interest.
   a. Whether a material is "absorptive" is relative to other materials used in the polarizer. Thus, an absorptive structure will absorb substantially more than a reflective or a transparent structure.
   b. Whether a material is "absorptive" is dependent on the wavelength of interest. A material can be absorptive in one wavelength range but not in another.
   c. In one aspect, an absorptive structure can absorb greater than 40% and reflect less than 60% of light in the wavelength of interest (assuming the absorptive structure is an optically thick film—i.e. greater than the skin depth thickness).
   d. Absorptive ribs can be used for selectively absorbing one polarization of light.
2. As used herein, the term "reflective" means substantially reflective of light in the wavelength of interest.
   a. Whether a material is "reflective" is relative to other materials used in the polarizer. Thus, a reflective structure will reflect substantially more than an absorptive or a transparent structure.
   b. Whether a material is "reflective" is dependent on the wavelength of interest. A material can be reflective in one wavelength range but not in another. Some wavelength ranges can effectively utilize highly reflective materials. At other wavelength ranges, especially lower wavelengths where material degradation is more likely to occur, the choice of materials may be more limited and an optical designer may need to accept materials with a lower reflectance than desired.
   c. In one aspect, a reflective structure can reflect greater than 80% and absorb less than 20% of light in the wavelength of interest (assuming the reflective structure is an optically thick film—i.e. greater than the skin depth thickness).
   d. Metals are often used as reflective materials.
   e. Reflective wires can be used for separating one polarization of light from an opposite polarization of light.
3. As used herein, the term "transparent" means substantially transparent to light in the wavelength of interest.
   a. Whether a material is "transparent" is relative to other materials used in the polarizer. Thus, a transparent structure will transmit substantially more than an absorptive or a reflective structure.
   b. Whether a material is "transparent" is dependent on the wavelength of interest. A material can be transparent in one wavelength range but not in another.
   c. In one aspect, a transparent structure can transmit greater than 90% and absorb less than 10% of light in the wavelength of interest.
4. As used in these definitions, the term "material" refers to the overall material of a particular structure. Thus, a structure that is "absorptive" is made of a material that as a whole is substantially absorptive, even though the material may include some reflective or transparent components. Thus for example, a rib made of a sufficient amount of absorptive material so that it substantially absorbs light is an absorptive rib even though the rib may include some reflective or transparent material embedded therein.

DETAILED DESCRIPTION

FIG. 1 shows a schematic perspective view of a wire grid polarizer (WGP or WGPs for plural) 10, including an array of parallel, elongated nanostructures 14 located over a surface of a transparent substrate 11. Each of the nanostructures 14 can include a plurality of parallel, elongated wires 13. WGP 10 is similar to WGP 170 (FIG. 17), details of which are described below.

Structures in other figures herein are schematic cross-sectional side views. Nanostructures 14, wires 13, ribs 12 and 22, and rods 122 in these structures are also elongated, similar to the WGP 10 in FIG. 1. Drawings in the figures are not necessarily to scale.

The pitch $P_{14}$ of the nanostructures 14 of WGP 10, and other WGPs described herein, can be limited by available lithography tools. By forming at least two pairs $13_i$ and $13_o$ of spaced-apart wires 13 on each nanostructure 14, the pitch of the wires (e.g. pitch $P_i$ of the inner-pair $13_i$) can be reduced, thus allowing polarization of smaller wavelengths of light. Smaller pitch $P_{14}$ can also result in improved overall WGP performance, including increased transmission of a desired polarization and increased contrast.

The term "elongated" means that a length 15 of the wires 13 is substantially greater than wire width $w_i$ and $w_o$ or a thickness Th of the wires 13. For example, WGPs for ultraviolet or visible light can have a wire width $w_i$ and $w_o$ between 5 and 50 nanometers in one aspect or between 10 and 30 nanometers in another aspect; and wire length 15 of greater than 1 millimeter in one aspect or greater than 20 centimeters in another aspect, depending on the application.

Thus, elongated wires can have a length 15 that is many times (even thousands of times) larger than wire width $w_i$ and $w_o$ or wire thickness Th.

There are many options for wire thickness Th and wire material composition in the various WGP embodiments herein. An example of wire thickness Th is between 50 and 300 nanometers. Examples of materials of construction of the wires include tungsten and titanium oxide. These materials can be 99% pure in one aspect (e.g. the wire 13 is 99% W or $TiO_2$), 95% pure in another aspect, or less than 95% pure in another aspect.

Methods of Making Wire Grid Polarizers

FIGS. 2-29 illustrate methods of making WGPs, in accordance with embodiments of the present invention. Steps in the method can be performed in the order as described in the following paragraphs.

Figure 2:
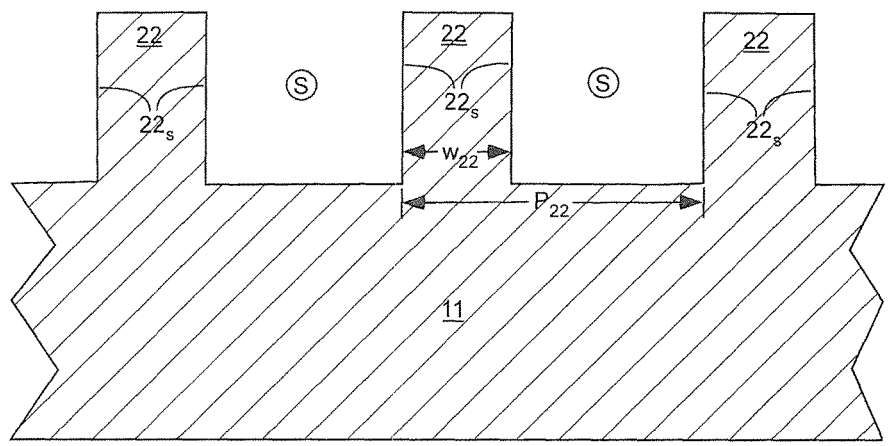
FIGS. 2-29 illustrate methods of making WGPs, in accordance with embodiments of the present invention. Steps in the methods of making can be sequential through the figures, except for the following.

FIG. 2 shows providing an array of parallel, elongated support ribs 22 over a transparent substrate 11, and spaces S between the support ribs 22. The spaces S can be solid-material-free.

Figure 3:
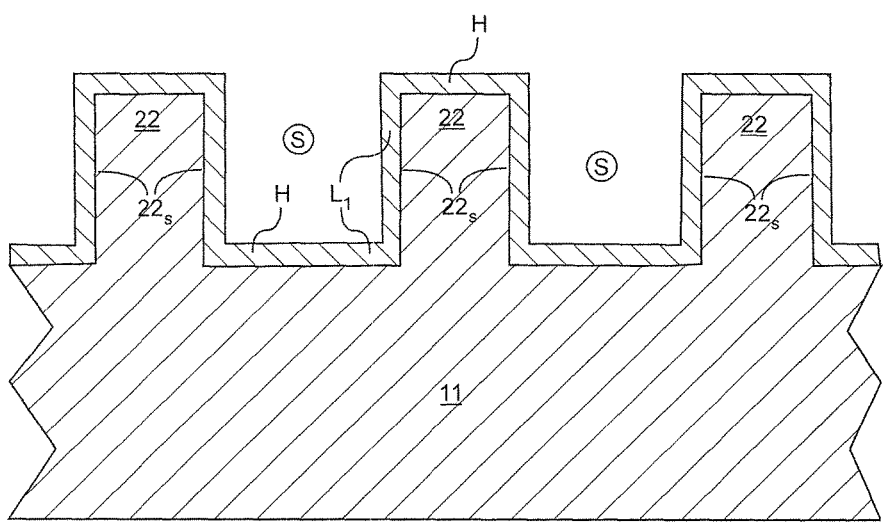

FIG. 3 shows conformal coating the substrate 11 and the support ribs 22 with a first-layer $L_1$ while maintaining solid-material-free at least a portion of the spaces S between the support ribs 22.

Figure 4:
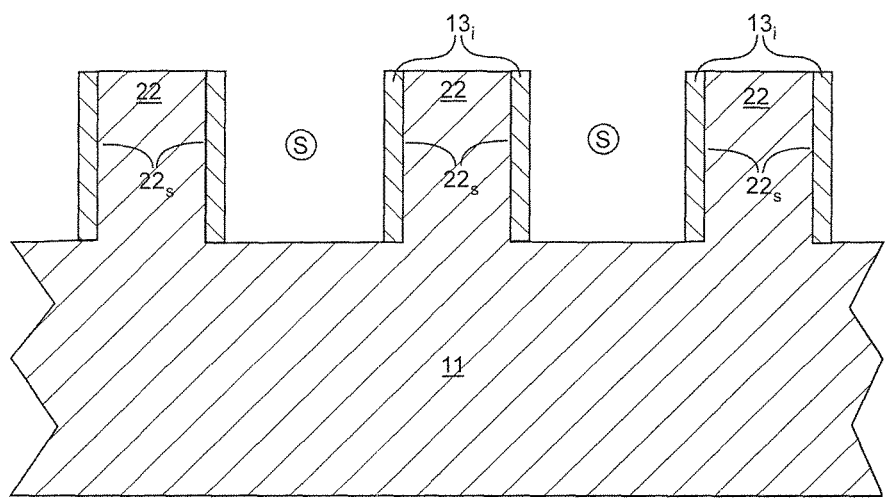

FIGS. 3-4 show etching (e.g. an anisotropic etch) the first-layer $L_1$ to remove horizontal segments H and leaving an array of inner-pairs $13_i$ of parallel, elongated wires 13 along sides of the support ribs 22. Each wire of each inner-pair $13_i$ can be separated from the other wire of the inner-pair $13_i$ by the intermediate support rib 22.

Figure 5:
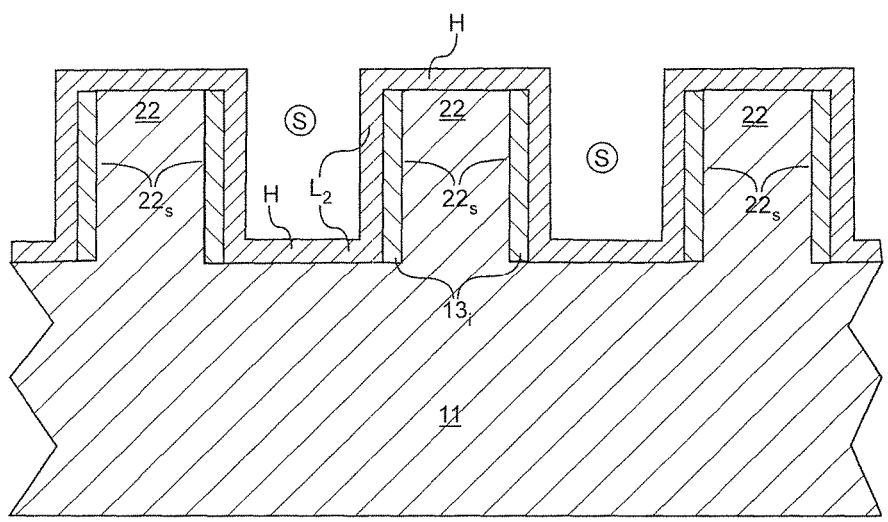

FIG. 5 shows conformal coating the substrate 11 and the support ribs 22 with a second-layer $L_2$ while maintaining solid-material-free at least a portion of the spaces S between the support ribs 22. After FIG. 5, the next step can be that shown in FIG. 6 or FIG. 18.

Figure 6:
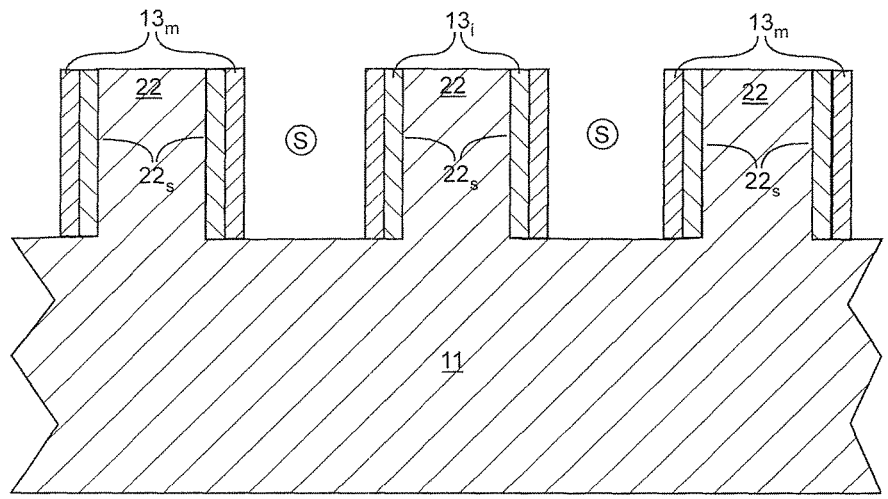

FIGS. 5-6 show etching (e.g. an anisotropic etch) the second-layer $L_2$ to remove horizontal segments H and leaving middle-pairs $13_m$. The middle-pairs $13_m$ can be an array of parallel, elongated wires 13 along sides of the support ribs 22. The two wires of each middle-pair $13_m$ can be separated from each other by the inner-pair $13_i$ and by the support rib 22.

Figure 7:
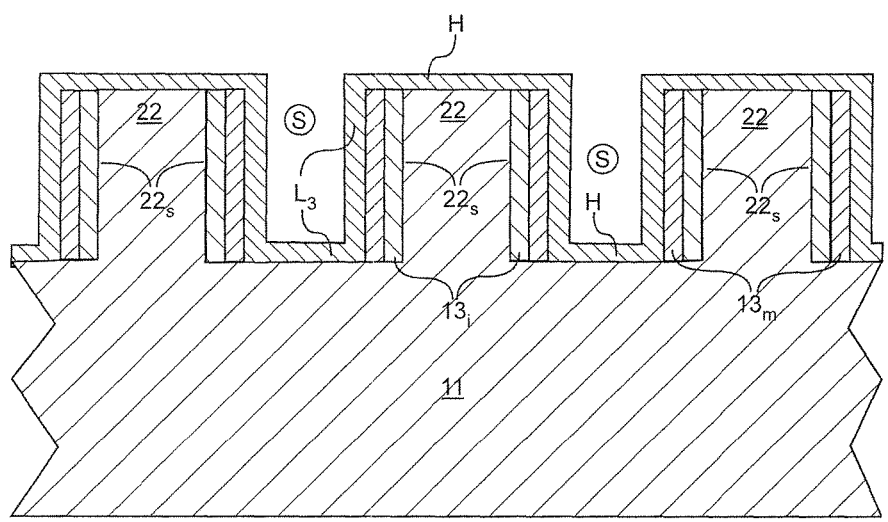

FIG. 7 shows conformal coating the substrate 11 and the support ribs 22 with a third-layer $L_3$ while maintaining solid-material-free at least a portion of the spaces S between the support ribs 22.

Figure 8:
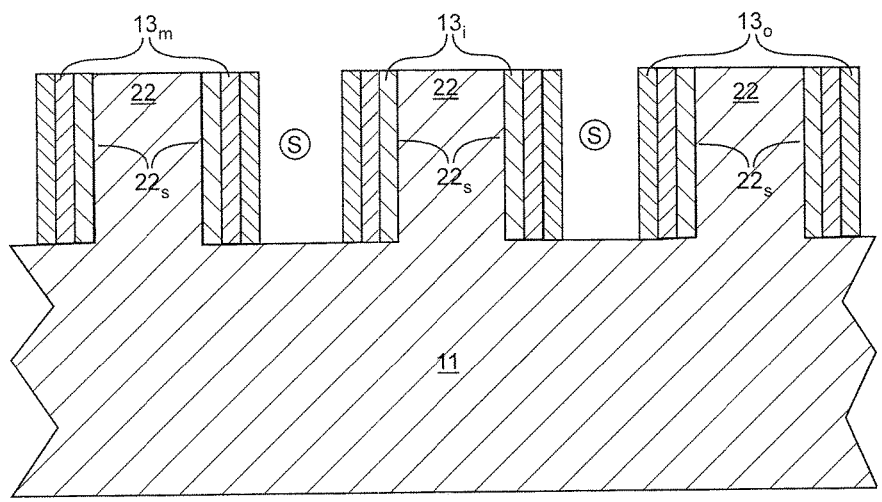

FIGS. 7-8 show etching (e.g. an anisotropic etch) the third-layer $L_3$ to remove horizontal segments H and leaving outer-pairs $13_o$. The outer-pairs $13_o$ can be an array of parallel, elongated wires 13 along sides of the support ribs 22. The two wires of each outer-pair $13_o$ can be separated from each other by the inner-pair $13_i$, the middle-pair $13_m$, and by the support rib 22. Wires of each outer-pair $13_o$ can be spaced apart with respect to wires of the inner-pair $13_i$ by wires of the middle-pair $13_m$. After FIG. 8, the next step can be that shown in FIG. 9 or FIG. 13.

Figure 9:
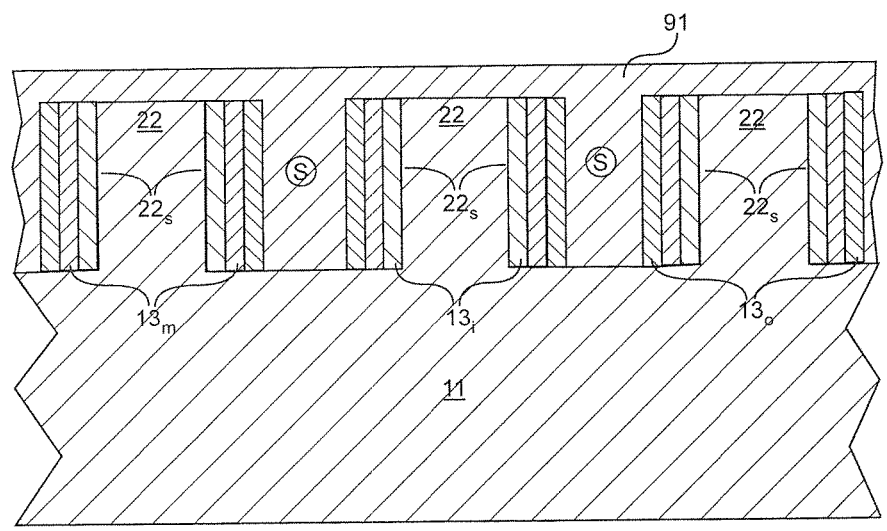

FIG. 9 shows filling the spaces S between the support ribs 22 with a solid material 91. For example, this can be done by ALD or spin-on glass. In subsequent steps, the solid material 91, the support ribs 22, and the middle-pair $13_m$ will be etched together. Therefore, it may be desirable to consider etch characteristics of the solid material 91 in relation to etch characteristics of the support ribs 22 and the middle-pair $13_m$. In one embodiment, the solid material 91 is made of the same material as the middle-pair $13_m$ and/or substrate 11 (e.g. $SiO_2$).

Figure 10:
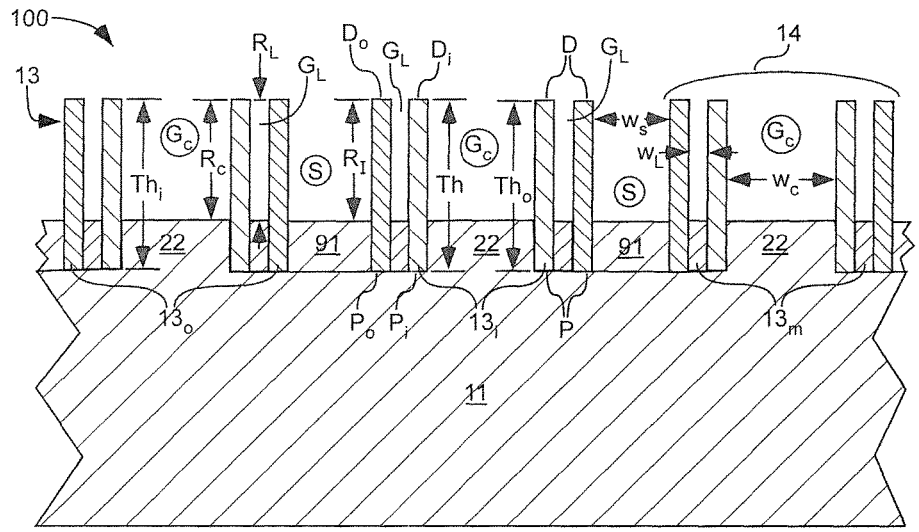

FIG. 10 shows (1) etching the middle-pair $13_m$ to form lateral-solid-material-free-regions $R_L$ between a portion of each wire of each outer-pair $13_o$ and a portion of an adjacent wire of the inner-pair $13_i$; (2) etching the support ribs 22 to form center-solid-material-free-regions $R_C$ between a portion of the two wires of each inner-pair $13_i$; and (3) etching the solid material 91 to form inter-nanostructure solid-material-free-regions $R_I$ between a portion of adjacent nanostructures. The above etches can be anisotropic. The etch chemistry can be selected to preferentially etch the middle-pair $13_m$, the support ribs 22, and the solid material 91, with minimal etching of the outer-pairs $13_o$ and the inner-pairs $13_i$.

Figure 11:
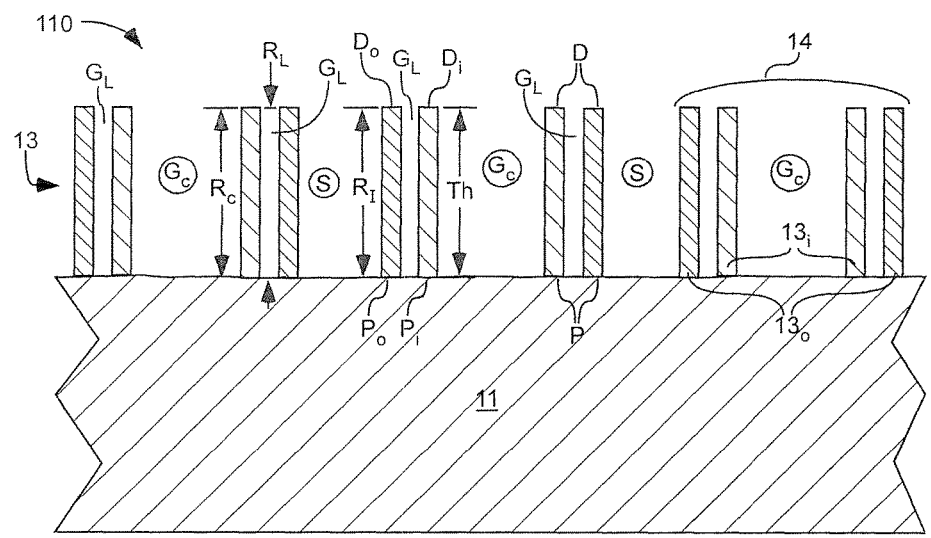

FIG. 11 shows etching to remove (1) the middle-pairs $13_m$ and forming the lateral-solid-material-free-regions $R_L$ from a distal-end $D_i$ to a proximal-end $P_i$ of the inner-pairs $13_o$; (2) the support ribs 22 and forming the center-solid-material-free-region $R_C$ from a distal-end $D_i$ to a proximal-end $P_i$ of the inner-pairs $13_i$; and (3) the solid material 91 and forming the inter-nanostructure solid-material-free-regions $R_I$ from a distal-end $D_i$ to a proximal-end $P_i$ of the outer-pairs $13_o$. The above etches can be anisotropic. In various embodiments, one, two, or all three of the support ribs 22, the solid material 91, and the middle-pair $13_m$ can be removed from a distal-end D to a proximal-end P of adjacent wires 13, depending on the material each is made of, and a width $w_s$, $w_L$, $w_c$ between adjacent wires 13.

Figure 12:
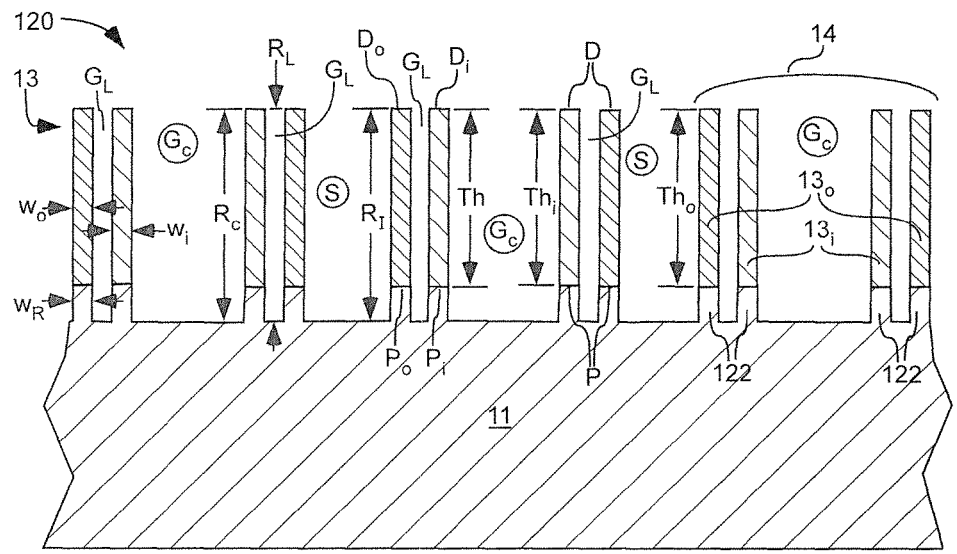

FIG. 12 shows using the outer-pair $13_o$ and the inner-pair $13_i$ as a mask and etching the substrate 11 to form an array of parallel, elongated rods 122, each rod located between a wire of the outer-pair $13_o$ or a wire of the inner-pair $13_i$ and the substrate 11. The rods 122 can be separated from each other by the lateral-solid-material-free-regions $R_L$, the center-solid-material-free-regions $R_C$, and the inter-nanostructure solid-material-free-regions $R_I$.

Figure 13:
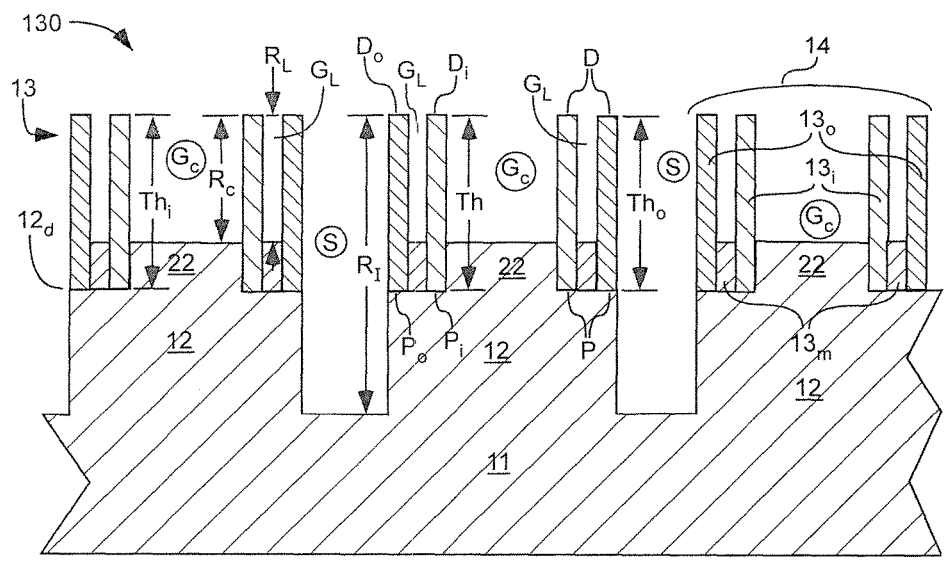

FIG. 13 can follow FIG. 8, and shows (1) etching the middle-pair $13_m$ to form lateral-solid-material-free-regions $R_L$ between a portion of each wire of each outer-pair $13_o$ and a portion of an f each inner-pair $13_i$; and (3) etching the substrate 11 between adjacent nanostructures 14 to form base-ribs 12 and inter-nanostructure solid-material-free-regions $R_I$ between adjacent base-ribs 12. One inner-pair $13_i$ and one outer-pair $13_o$ can be located on each base-rib 12. The above etches can be anisotropic. The etch chemistry can be selected to preferentially etch the middle-pair $13_m$, the support ribs 22, and the substrate 11, with minimal etching of the outer-pairs $13_o$ and the inner-pairs $13_i$.

Figure 14:
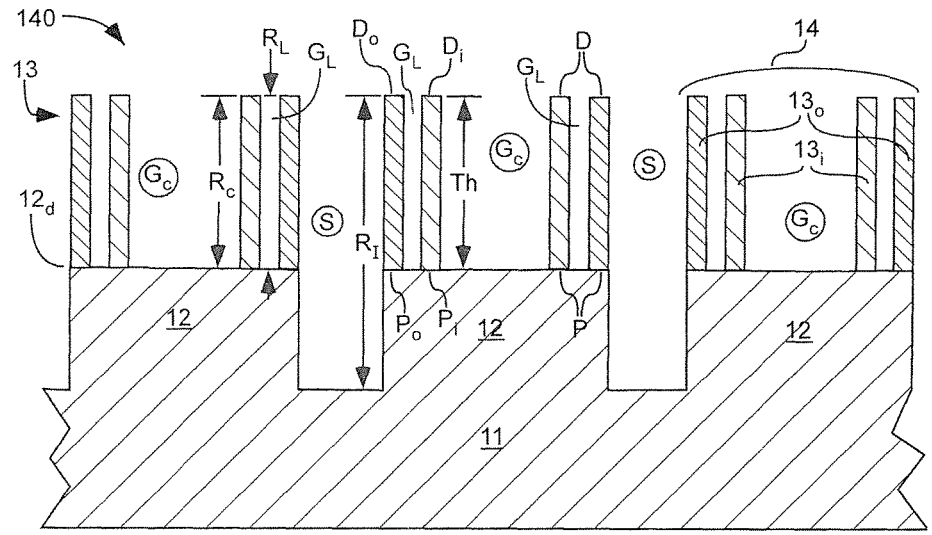

FIG. 14 shows (1) removing the middle-pairs $13_m$ and forming the lateral-solid-material-free-regions $R_L$ from a distal-end $D_i$ to a proximal-end $P_i$ of the inner-pairs $13_o$; (2) removing the support ribs 22 and forming the center-solid-material-free-region $R_C$ from a distal-end $D_i$ to a proximal-end $P_i$ of the inner-pairs $13_i$; and (3) etching the substrate 11 between adjacent nanostructures 14 to form base-ribs 12 and inter-nanostructure solid-material-free-regions $R_I$ between adjacent base-ribs 12. The above etches can be anisotropic. In various embodiments, one or both of the support ribs 22 and the middle-pair $13_m$ can be removed from a distal-end D to a proximal-end P of adjacent wires 13, depending on the material each region is made of, and a width $w_s$, $w_L$, $w_c$ between adjacent wires 13.

Figure 15:
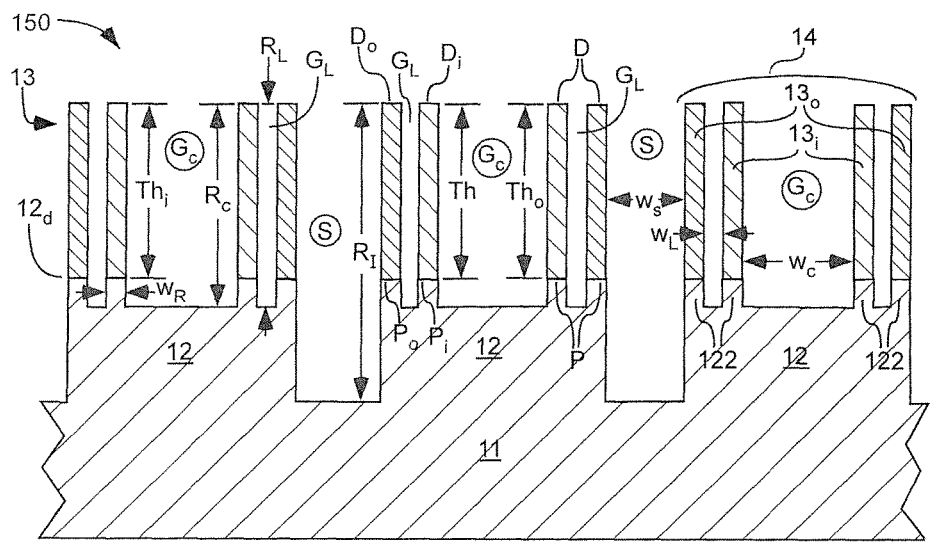

FIG. 15 shows using the outer-pair $13_o$ and the inner-pair $13_i$ as a mask and etching the substrate 11 to form an array of parallel, elongated rods 122, each rod 122 located between a wire of the outer-pair $13_o$ or a wire of the inner-pair $13_i$ and the substrate 11. The rods 122 can be separated from each other by the lateral-solid-material-freeregions $R_L$, the center-solid-material-free-regions $R_c$, and the inter-nanostructure solid-material-free-regions $R_I$.

Figure 16:
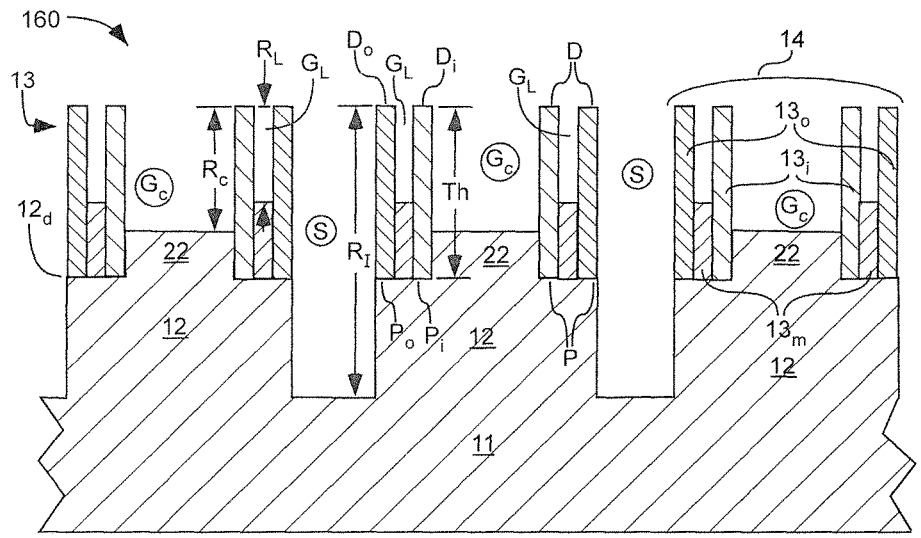
Figure 17:
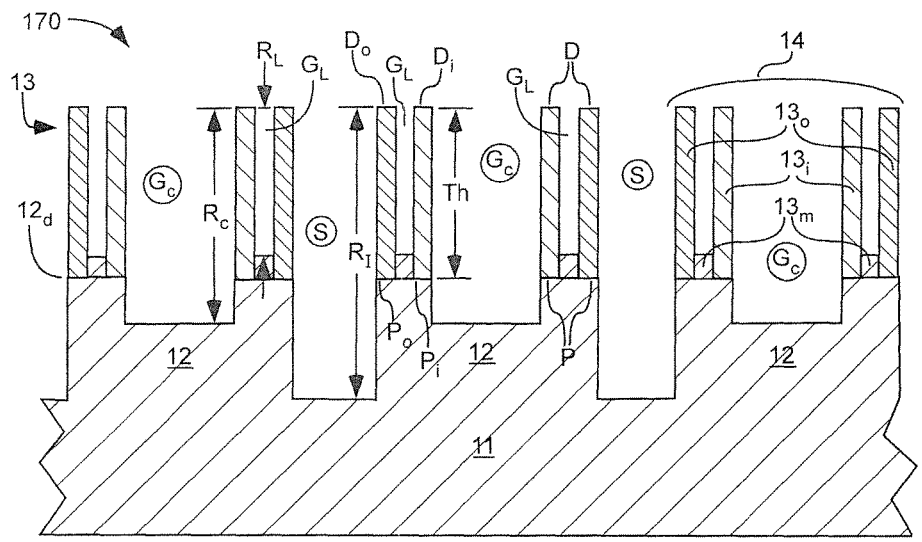

As shown in FIG. 16-17, in contrast to FIGS. 13 & 15, a distance of the lateral-solid-material-free-regions $R_L$, from the distal-end D to the proximal-end P (and possibly beyond the proximal-end P) of the wires 13, does not need to equal this distance of the center-solid-material-free-regions $R_c$. A depth of etch of the lateral-solid-material-free-regions $R_L$, the center-solid-material-free-regions $R_c$, and the inter-nanostructure solid-material-free-regions $R_I$, can be based on materials that are etched and a width $w_s$, $w_L$, $w_c$ (see FIGS. 10 & 15) of each region.

Figure 18:
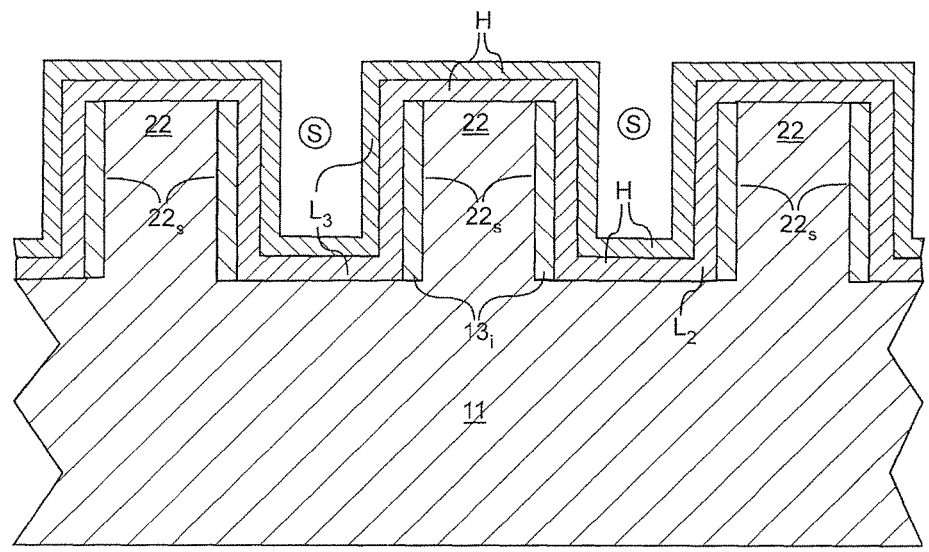

FIG. 18 can follow FIG. 5. FIG. 18 shows conformal coating the substrate 11 and the support ribs 22 with a third-layer $L_3$ while maintaining solid-material-free at least a portion of the spaces S between the support ribs 22.

Figure 19:
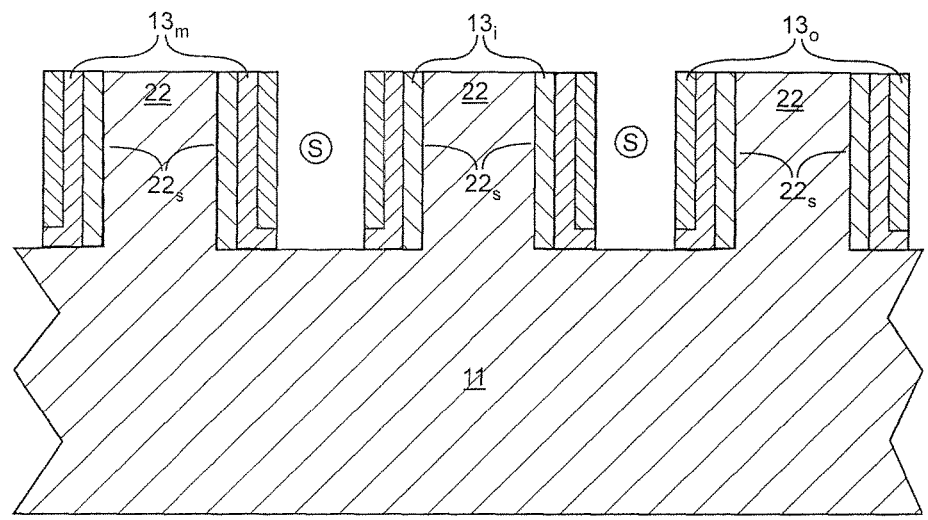

FIGS. 18-19 show etching (e.g. an anisotropic etch) the third-layer $L_3$ and the second-layer $L_3$ to remove horizontal segments H and leave outer-pairs $13_o$ and middle-pairs $13_m$. The outer-pairs $13_o$ and middle-pairs $13_m$ can each be arrays of parallel, elongated wires 13 along sides of the support ribs 22. The two wires of each outer-pair $13_o$ can be separated from each other by the inner-pair $13_i$, the middle-pair $13_m$, and by the support rib 22. Wires of each outer-pair $13_o$ can be spaced apart with respect to wires of the inner-pair $13_i$ by wires of the middle-pair $13_m$. Following FIG. 19, the method shown in FIGS. 9-12, and as described above can be followed. Alternatively, the method shown in FIGS. 20-21 can be followed, which is similar to that shown in FIGS. 13-17.

Figure 20:
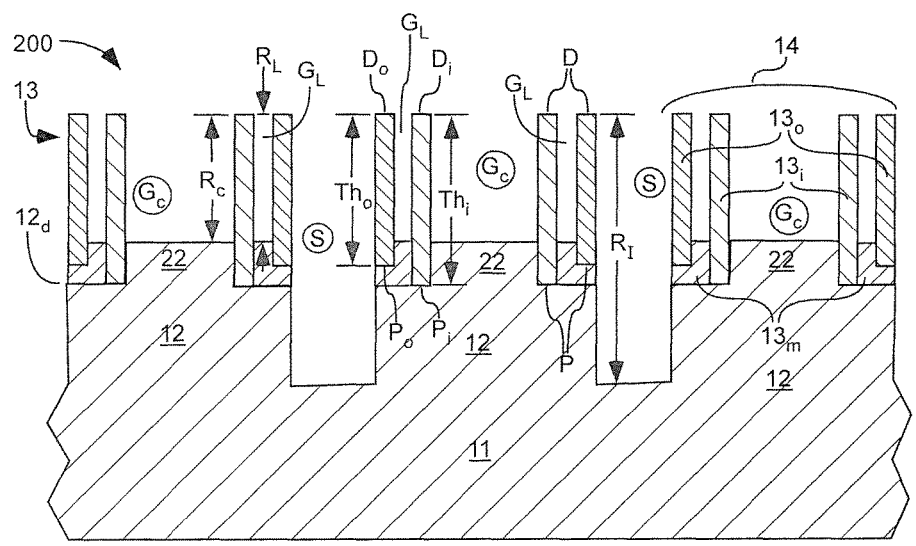

FIG. 20 shows (1) etching the middle-pair $13_m$ to form lateral-solid-material-free-regions $R_L$ between a portion of each wire of each outer-pair $13_o$ and a portion of an adjacent wire of the inner-pair $13_i$; (2) etching the support ribs 22 to form center-solid-material-free-regions $R_c$ between a portion of the two wires of each inner-pair $13_i$; and (3) etching the substrate 11 between adjacent nanostructures 14 to form base-ribs 12 and inter-nanostructure solid-material-free-regions $R_I$ between adjacent base-ribs 12. One inner-pair $13_i$ and one outer-pair $13_o$ can be located on each base-rib 12. The above etches can be anisotropic. The etch chemistry can be selected to preferentially etch the middle-pair $13_m$, the support ribs 22, and the substrate 11, with minimal etching of the outer-pairs $13_o$ and the inner-pairs $13_i$. This is similar to the method shown in FIG. 13.

Figure 21:
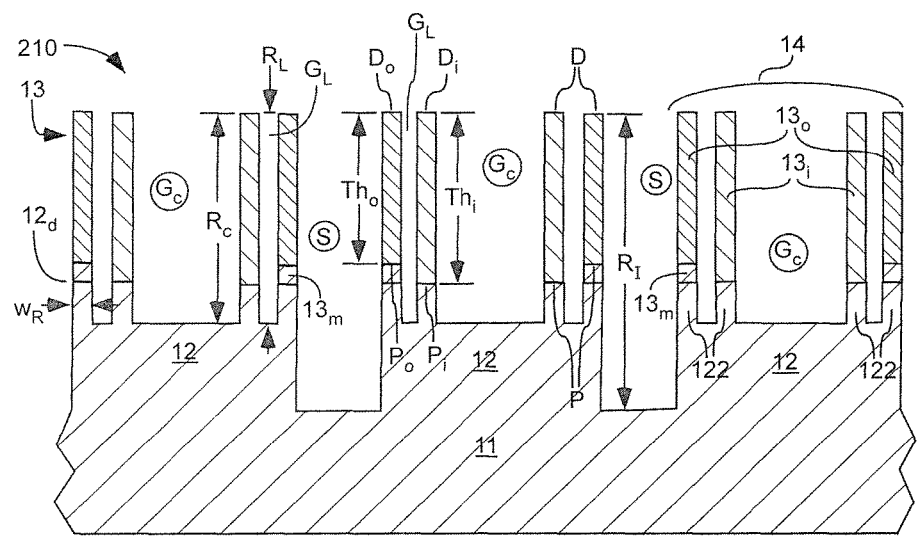

FIG. 21 shows using the outer-pair $13_o$ and the inner-pair $13_i$ as a mask and etching the substrate 11 and the base-ribs 12 to form an array of parallel, elongated rods 122, each rod 122 located between a wire 13 of the outer-pair $13_o$ or a wire 13 of the inner-pair $13_i$ and the substrate 11. The rods 122 can be separated from each other by the lateral-solid-material-free-regions $R_L$, the center-solid-material-free-regions $R_c$, and the inter-nanostructure solid-material-free-regions $R_I$. This is similar to the method shown in FIG. 15.

Figure 22:
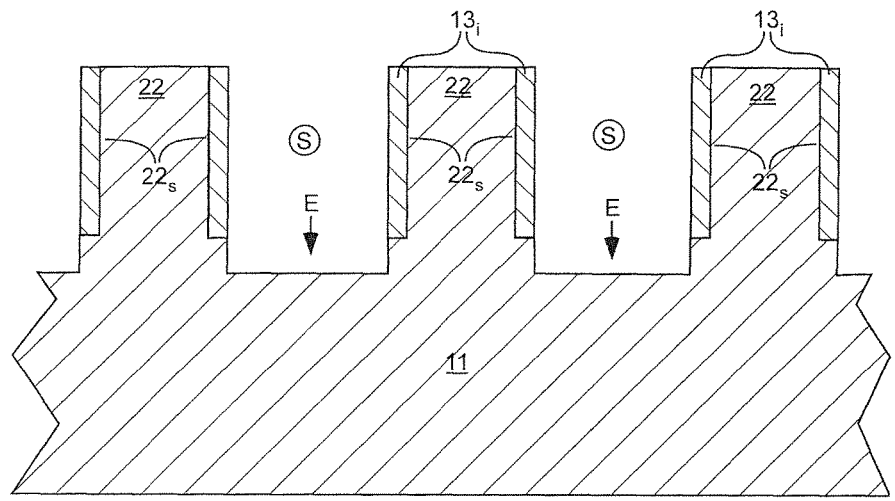

FIG. 22 can follow FIG. 4 and shows etching E etching into the substrate 11 between inner-pairs 13 and adjacent inner-pairs $13_i$. The etching shown in FIGS. 3-4 and 22 can be done in a single etch step. FIG. 22 can be followed by FIG. 5. After adding and etching the second-layer $L_2$ and the third-layer $L_3$, plus etching the support ribs 22, the middle-pair $13_m$ and further etch of the substrate 11, the resulting structure can be as shown in FIGS. 23-24.

Figure 23:
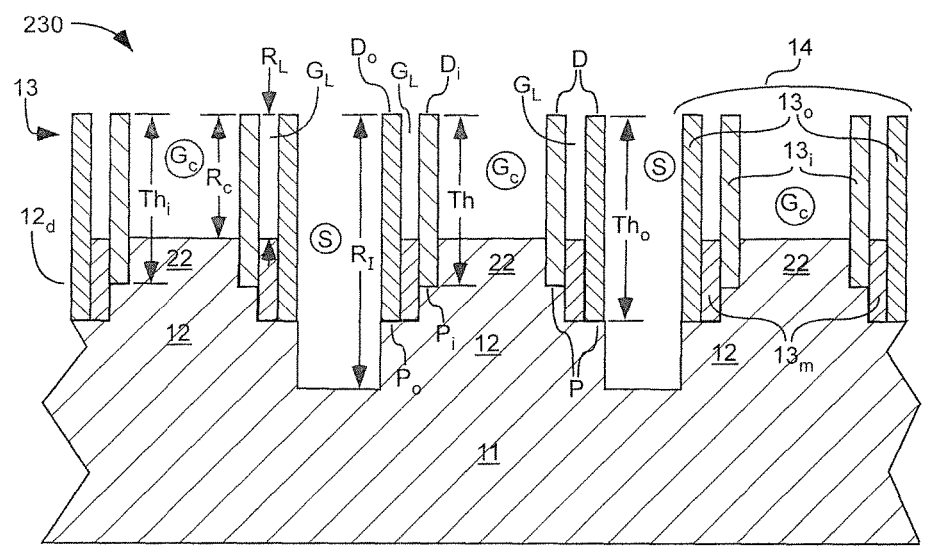

FIG. 23 can follow FIG. 8, 9, or 19 (if FIG. 4 was followed by FIG. 22), and shows (1) etching the middle-pair $13_m$ to form lateral-solid-material-free-regions $R_L$ between a portion of each wire of each outer-pair $13_o$ and a portion of an adjacent wire of the inner-pair $13_i$; (2) etching the support ribs 22 to form center-solid-material-free-regions $R_c$ between a portion of the two wires of each inner-pair $13_i$. The above etches can be anisotropic. The etch chemistry can be selected to preferentially etch the middle-pair $13_m$, the support ribs 22, and the substrate 11, with minimal etching of the outer-pairs $13_o$ and the inner-pairs $13_i$.

Figure 24:
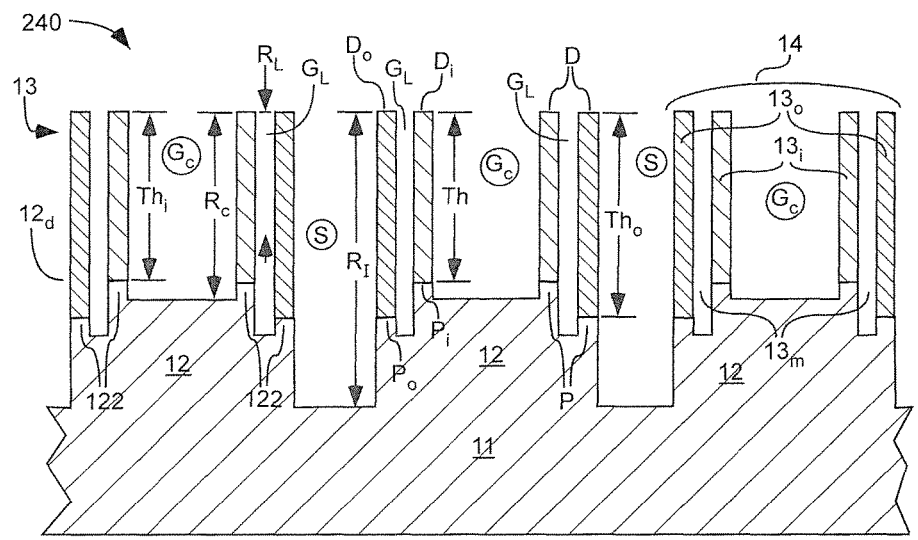

FIG. 24 shows (1) removing the middle-pairs $13_m$ and forming the lateral-solid-material-free-regions $R_L$ from a distal-end $D_i$ to a proximal-end $P_i$ of the inner-pairs $13_o$; (2) removing the support ribs 22 and forming the center-solid-material-free-region $R_c$ from a distal-end $D_i$ to a proximal-end $P_i$ of the inner-pairs $13_i$. The above etches can be anisotropic. In various embodiments, one or both of the support ribs 22 and the middle-pair $13_m$ can be removed from a distal-end D to a proximal-end P of adjacent wires 13, depending on the material each region is made of, and a width $w_s$, $w_L$, $w_c$ between adjacent wires 13.

Figure 25:
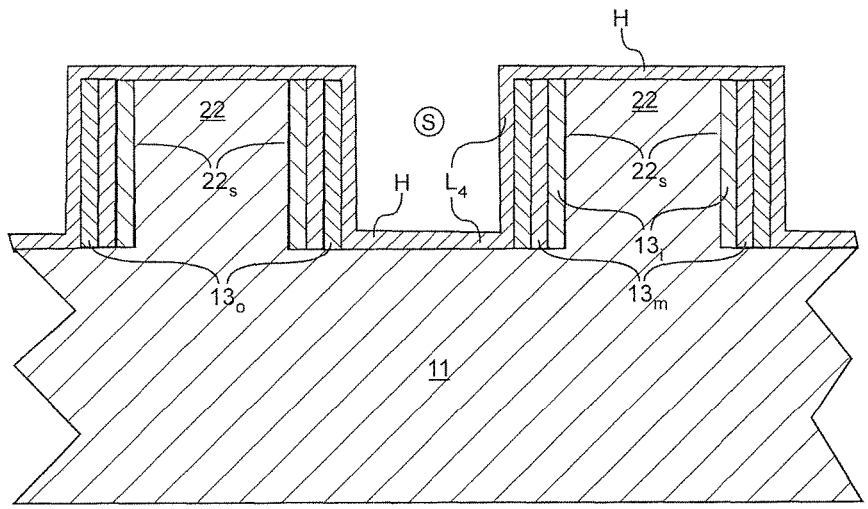

FIG. 25 can follow FIG. 8 or FIG. 19. FIG. 25 shows conformal coating the substrate 11 and the support ribs 22 with a fourth-layer $L_4$ while maintaining solid-material-free at least a portion of the spaces S between the support ribs 22.

Figure 26:
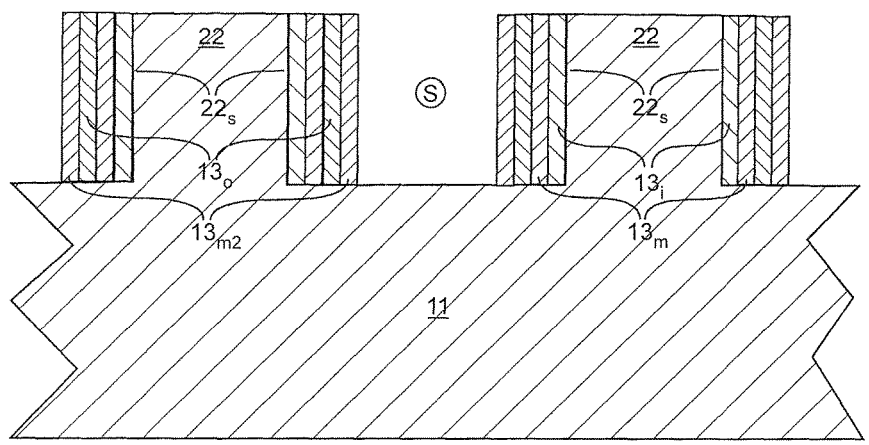

FIGS. 25-26 show etching (e.g. an anisotropic etch) the fourth-layer $L_4$ to remove horizontal segments H and leave second-middle-pairs $13_{m2}$. The second-middle-pairs $13_{m2}$ can be an array of parallel, elongated wires 13 along sides of the support ribs 22. The two wires 13 of each second-middle-pair $13_{m2}$ can be separated from each other by the inner-pair $13_i$, the middle-pair $13_m$, the outer-pair $13_o$, and the support rib 22.

Figure 27:
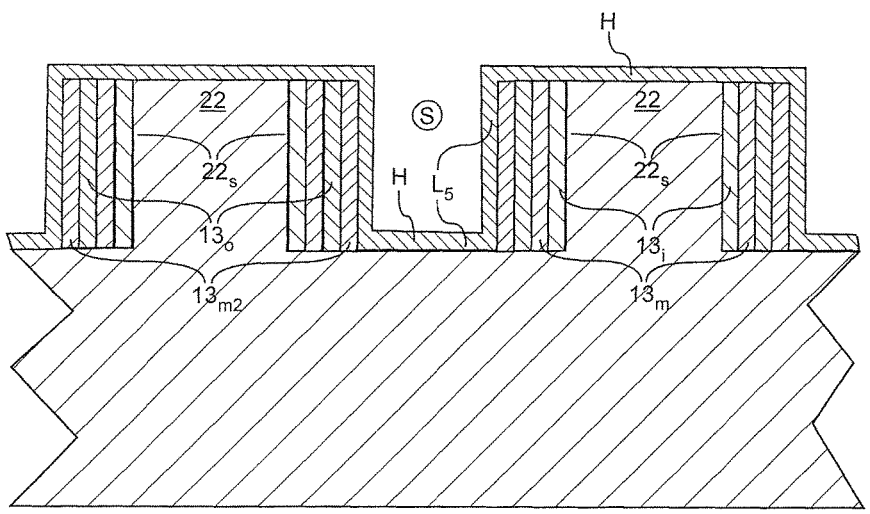

FIG. 27 shows conformal coating the substrate 11 and the support ribs 22 with a fifth-layer $L_5$ while maintaining solid-material-free at least a portion of the spaces S between the support ribs 22. FIG. 27 can follow FIG. 25 directly, if it is desired that second-middle-pairs $13_{m2}$ have an L-shape, similar to middle-pairs $13_m$ shown in FIGS. 20-21. Alternatively, FIG. 27 can follow FIG. 26.

Figure 28:
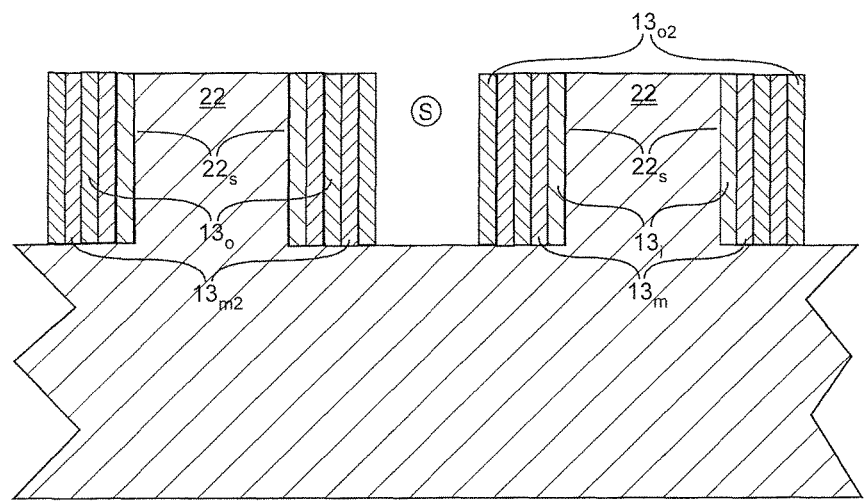

FIGS. 27-28 show etching (e.g. an anisotropic etch) the fifth-layer $L_5$ to remove horizontal segments H and leaving second-outer-pairs $13_{o2}$. The fourth-layer $L_4$ would also be etched in this step if the step shown in FIG. 23 is skipped. The second-outer-pairs $13_{o2}$ can be an array of parallel, elongated wires 13 along sides of the support ribs 22. The two wires 13 of each second-outer-pair $13_{o2}$ can be separated from each other by the second-middle-pair $13_{m2}$, the outer-pair $13_o$, inner-pair $13_i$, the middle-pair $13_m$, and by the support rib 22. Wires of each second-outer-pair $13_o$ can be spaced apart with respect to wires of the outer-pair $13_o$ by wires of the second-middle-pair $13_{m2}$. The steps shown in FIGS. 25-28 can be repeated as many times as desired or until the spaces S are filled. The following step can be an etch, as shown in FIG. 29, or fill with a solid material 91 as shown in FIG. 9, then etch as shown in FIGS. 10-12.

Figure 29:
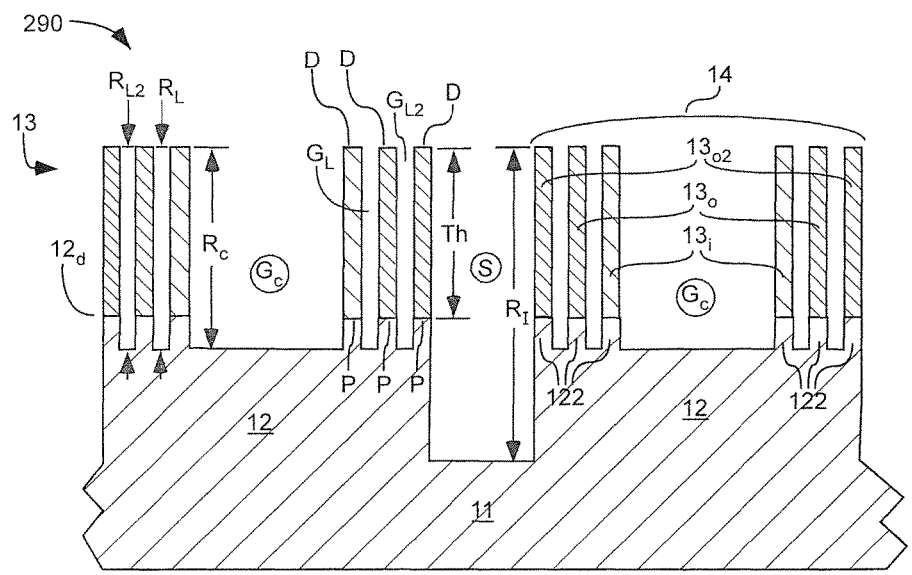

FIG. 29 shows (1) etching the middle-pair $13_m$ to form lateral-solid-material-free-regions $R_L$ between at least a portion of each wire of each outer-pair $13_o$ and a portion of an adjacent wire of the inner-pair $13_i$; (2) etching the second-middle-pair $13_{m2}$ to form second lateral-solid-material-free-regions $R_{L2}$ between at least a portion of each wire of each second-outer-pair $13_{o2}$ and a portion of an adjacent wire of the outer-pair $13_o$; (3) etching the support ribs 22 to form center-solid-material-free-regions $R_c$ between at least a portion of the two wires of each inner-pair $13_i$; and (4) etching the substrate 11 between adjacent nanostructures 14 to form base-ribs 12 and inter-nanostructure solid-material-free-regions $R_I$ between adjacent base-ribs 12. One inner-pair $13_i$, one outer-pair $13_o$, and one second-outer-pair $13_{o2}$ can located on each base-rib 12. The above etches can be anisotropic. The etch chemistry can be selected to preferentially etch the second-middle-pair $13_{m2}$, the middle-pair $13_m$, the support ribs 22, and the substrate 11, with minimal etching of the second-outer-pairs $13_{o2}$, the outer-pairs $13_o$, and the inner-pairs $13_i$.

The etch shown in FIG. 29 can continue from the distal-end D to the proximal-end P (and possibly beyond the proximal-end P) of at least some of the wires 13. The second-outer-pair $13_{o2}$, the outer-pairs $13_o$, and the inner-pairs $13_i$ can be used as a mask for etching the substrate 11 to form an array of parallel, elongated rods 122, each rod located between a wire of the second-outer-pair $13_{o2}$, a wire of the outer-pair $13_o$, or a wire of the inner-pair $13_i$ and the substrate 11. The rods 122 can be separated from each other by the second lateral-solid-material-free-regions $R_{L2}$, the lateral-solid-material-free-regions $R_L$, the center-solid-material-free-regions $R_c$, and the inter-nanostructure solid-material-free-regions $R_I$. Thus, the etch described in regard to FIG. 26 can be similar to those shown in FIGS. 13-17, with the exception of the additional etch of the second-middle-pair $13_{m2}$ shown in FIGS. 28-29.

In the above method, the following can be reflective: the first-layer $L_1$, the third-layer $L_3$, the fifth-layer $L_5$, or combinations thereof. Two or more of these layers $L_1$, $L_3$, and $L_5$ can be made of different materials, but each can still be reflective. In the above method, the following can be absorptive: the first-layer $L_1$, the third-layer $L_3$, the fifth-layer $L_5$, or combinations thereof. Two or more of these layers $L_1$, $L_3$, and $L_5$ can be made of different materials, but each can still be absorptive. If one layer is reflective, then it is not absorptive, and vice versa. In the above method, the following can be transparent: the second-layer $L_2$, the fourth-layer $L_4$, or combinations thereof.

Wire Grid Polarizer of FIGS. 10-12

Illustrated in FIGS. 10-12 are WGPs 100, 110, and 120. The WGPs 100, 120, and 130 can comprise an array of parallel, elongated nanostructures 14 located over a surface of a transparent substrate 11, and a plurality of spaces S, including a space S between adjacent nanostructures 14. Each of the nanostructures 14 can include a plurality of parallel, elongated wires 13 located on the substrate 11, including an inner-pair $13_i$ located between an outer-pair $13_o$.

Wire Grid Polarizer of FIGS. 13-17

Illustrated in FIGS. 13-17 are WGPs 130, 140, 150, 160, and 170. The WGPs 130, 140, 150, 160, and 170 can comprise an array of parallel, elongated nanostructures 14 located over a transparent substrate 11, and a plurality of spaces S, including a space S between adjacent nanostructures 14. Each of the nanostructures 14 can include an elongated base-rib 12 located over the substrate 11.

Each base rib 12 can have a distal-surface $12_d$ located away from the substrate 11. A plurality of parallel, elongated wires 13 can be located on the distal-surface $12_d$ of the base-rib 12, including an inner-pair $13_i$ located between an outer-pair $13_o$.

Similarities and Comparison of Wire Grid Polarizers of FIGS. 10-17

The wires 13 can be laterally oriented and spaced apart with respect to one another. "Laterally oriented" refers to a direction substantially perpendicular to the length 15 (see FIG. 1 of the wires 13).

Each wire can have a proximal-end P closer to the substrate 11 and a distal-end D farther from the substrate 11. A thickness Th of each wire 13 is defined as a distance from the proximal-end P to the distal-end D.

There can be a lateral-gap $G_L$ between each wire 13 of the outer-pair $13_o$ and an adjacent wire 13 of the inner-pair $13_i$. As shown in FIGS. 10, 13, 16, and 17, part of each lateral-gap $G_L$ can be a lateral-solid-material-free-region $R_L$. The lateral-solid-material-free-region $R_L$ can extend from the distal-end $D_i$ towards the proximal-end $P_i$, of a wire 13 of the inner-pair $13_i$ adjacent to the lateral-gap $G_L$, for a distance of at least 25% in one aspect, at least 50% in another aspect, at least 80% in another aspect, at least 90% in another aspect, or between 70% and 98% in another aspect, of a thickness $Th_i$ of a wire 13 of the inner-pair $13_i$ adjacent to the lateral-gap $G_L$. A remaining portion of each lateral-gap $G_L$ can be filled with a wire 13 of the middle-pair $13_m$.

As shown in FIGS. 11, 12, 14, and 15, the lateral-gaps $G_L$ can be entirely solid-material-free. As shown in FIGS. 11 and 14, the lateral-solid-material-free-regions $R_L$ can terminate at the proximal-end P. As shown in FIGS. 12 & 15 the lateral-solid-material-free-regions $R_L$ can extend beyond the proximal-end P into the substrate 11 or the base-rib 12, respectively. For example, the lateral-gaps $G_L$ can be solid-material-free from the distal-end D, to the proximal-end $P_i$, and beyond the proximal-end $P_i$ for a distance of at least 10% of the thickness $Th_i$ of at least one of the wires 13 of the inner-pair $13_i$.

There can be a center-gap $G_c$ between the two wires 13 of the inner-pair $13_i$. As shown in FIGS. 10, 13, and 16, part of each center-gap $G_c$ can be a center-solid-material-free-region $R_c$ and the remainder can be the support-rib 22. For example, the center-solid-material-free-region $R_c$ can extend from the distal-end $D_i$ towards the proximal-end $P_i$, of a wire 13 of the inner-pair 13 adjacent to the center-gap $G_c$, for a distance of at least 25% in one aspect, at least 50% in another aspect, at least 80% in another aspect, at least 90% in another aspect, or between 70% and 98% in another aspect of a thickness $Th_i$ of a wire of the inner-pair $13_i$.

As shown in FIGS. 11, 12, 14, 15, and 17, the center-gaps $G_c$ can be entirely solid-material-free. As shown in FIGS. 11 and 14, the center-solid-material-free-regions $R_c$ can terminate at the proximal-end P. As shown in FIGS. 12, 15, & 17 the center-solid-material-free-regions $R_c$ can extend beyond the proximal-end P into the substrate 11 (FIG. 12) or the base-rib 12 (FIGS. 15 & 17). For example, the center-solid-material-free-regions $R_c$ can extend from the distal-end $D_i$ to the proximal-end $P_i$, and beyond the proximal-end $P_i$ for a distance of at least 10% in one aspect or at least 25% in another aspect, of the thickness $Th_i$ of at least one of the wires 13 of the inner-pair $13_i$.

As shown in FIG. 10, the spaces S can include an inter-nanostructure solid-material-free-region $R_I$. As shown in FIG. 11, the inter-nanostructure solid-material-free-region $R_I$ can extend from the distal-end $D_o$ to the proximal-end $P_o$ of at least one of the wires 13 of the outer-pair $13_o$ that adjoins the space S. As shown in FIGS. 12-17, the spaces S can be solid-material-free from the distal-end D to the proximal-end P, and beyond the proximal-end P for a distance of at least 5% in one aspect, at least 15% in another aspect, at least 25% in another aspect, of the thickness $Th_o$ of at least one of the wires 13 of an outer-pair $13_o$ that adjoins the space S.

A width $w_L$ of the lateral-gaps $G_L$, a width $w_c$ of the center-gap $G_c$, and a width $w_s$ the space S are shown in FIGS. 10 and 15. These widths $w_L$, $w_c$, and $w_s$ can all be the same, two of them can be the same, or they can all be different from one another. For example, the width $w_L$ of the lateral-gaps $G_L$, the width $w_c$ of the center-gap $G_c$, and the width $w_s$ the space S can all differ from one another by at least 3 nanometers in one aspect, at least 5 nanometers in another aspect, at least 10 nanometers in another aspect. As another example, a largest of these widths ($w_L$, $w_c$, and $w_s$) can differ from a smallest of these widths ($w_L$, $w_c$, and $w_s$) by at least 25% in one aspect, at least 50% in another aspect, or at least 75% in another aspect. Thus, if the width $w_L$ of the lateral-gaps $G_L$ is the smallest and the width we of the center-gap $G_c$ is the largest, then $w_c-w_L>0.25*w_L$, $w_c-w_L>0.50*w_L$, or $w_c-w_L>0.25*w_L$. As another example, the width $w_L$ Of each lateral-gap $G_L$ can be smaller than the width we of each center-gap $G_c$ and smaller than the width $w_s$ of each space S ($w_L<w_c$ and $w_L<w_s$).

A size of, and a relation among, these widths $w_L$, $w_c$, and $w_s$, can be based on a pitch $P_{22}$ of the support ribs (see FIG. 2), a width $w_{22}$ of the support ribs (see FIG. 2), and a thickness of each layer (e.g. $L_1$, $L_2$, and $L_3$). The size of, and a relation among, these widths $w_L$, $w_c$, and $w_s$, can be changed to optimize each particular WGP design. Allowing the possibility of these widths $w_L$, $w_c$, and $w_s$ being different gives the WGP designer an added degree of freedom for improving designs.

As shown in FIGS. 10, 13, and 16, there can be a support-rib 22 in the center-gap $G_c$, between the two wires 13 of the inner-pair $13_i$. The support-rib 22 can extend substantially orthogonal to a planar-surface of the substrate on which the wires 13 are located. The support-rib 22 can provide structural support for these wires 13. This can be especially important if the inner-pair $13_i$ wire width $w_i$ is small and/or aspect ratio is high. The support-rib 22, however, can decrease WGP performance. Thus, each design can be evaluated to determine whether improved performance or increased inner-pair $13_i$ stability is more important. For example, the support-rib 22 can extend between 5% and 75% in one aspect or between 5% and 25% in another aspect of a distance from the proximal-end $P_i$ towards the distal-end $D_i$ of at least one of the wires of the inner-pair $13_i$.

As shown in FIGS. 10, 13, 16, and 17, the plurality of parallel, elongated wires 13 can also include a middle-pair $13_m$. Wires of the middle-pair $13_m$ can be laterally oriented with respect to one another, to the inner-pair $13_i$, and to the outer-pair $13_o$. Each wire of the middle-pair $13_m$ can be located between a wire 13 of the inner-pair $13_i$ and a wire 13 of the outer-pair $13_o$. Each wire of the middle-pair $13_m$ can be separated from the other wire 13 of the middle-pair $13_m$ by wires 13 of the inner-pair $13_i$ and by the center-gap $G_c$. Similar to the support-rib 22, the middle-pair $13_m$ can provide structural support for the inner-pair $13_i$ and to the outer-pair $13_o$, but the middle-pair $13_m$ can adversely affect WGP performance. Thus, each design can be evaluated to determine whether improved performance or increased wire 13 stability is more important. For example, the middle-pair $13_m$ can extend between 5% and 75% in one aspect or between 5% and 25% in another aspect of a distance from the proximal-end $P_i$ towards the distal-end $D_i$ of at least one of the wires 13 of the inner-pair $13_i$, adjacent to the middle-pair $13_m$.

Wires 13 of WGP 100 might be the most stable due to the support-rib 22 in the center-gaps $G_c$, the middle-pair $13_m$ in the lateral-gaps $G_L$, and the solid material 91 in the spaces S. Disadvantages of this design include an added manufacturing step (FIG. 9) and possibly reduced performance. These factors can be weighed in each WGP design.

As shown in FIGS. 16-17, the center-solid-material-free-region $R_c$ and the lateral-solid-material-free-region $R_L$ can extend for different distances from the distal-end $D_i$ towards (and possibly beyond) the proximal-end $P_i$, of a wire 13 of the inner-pair $13_i$.

As shown in FIGS. 12, 15, and 21, each of the nanostructures 14 can further include an array of parallel, elongated rods 122, including a rod 122 associated with each wire 13. Each rod 122 can be located between the substrate 11 and the wire 13 it is associated with. Each rod 122 can have a width $w_R$ that is within $+/-25\%$ of a width (see $w_o$ or $w_i$ in FIG. 12) of the wire 13 it is associated with, (e.g. $w_o-0.25*w_o<w_R<w_o+0.25*w_o$). Sidewalls of each rod 122 can be aligned with sidewalls of each associated wire 13. The rods 122 can be separated from each other by the lateral-solid-material-free-regions $R_L$, the center-solid-material-free-regions $R_c$, and the inter-nanostructure solid-material-free-regions $R_I$. WGPs with these rods 122 can have improved performance, especially at lower wavelengths, but the wires 13 in such WGPs can have reduced structural strength. These factors can be weighed in each WGP design.

By using a different material for the first-layer $L_1$ than is used for the third-layer $L_3$ (see FIG. 3 plus FIG. 7 or 18 and accompanying description above), a chemical composition of the inner-pair $13_i$ can be different from a chemical composition of the outer-pair $13_o$. Also, a different material can be used for the second-layer $L_2$ than is used for the first-layer $L_1$ and/or the third-layer $L_3$ (see FIG. 5 and accompanying description above), and thus a chemical composition of the middle-pair $13_m$ can be different from a chemical composition of the inner-pair $13_i$ and/or the outer-pair $13_o$.

Having different wires 13 made of different materials for can be useful for broadening the useful wavelength range or adding additional functionality to the WGP. At least one of the following can be reflective and at least one of the following can be absorptive: the inner-pair $13_i$, the middle-pair $13_m$, and the outer-pair $13_o$. At least one of the following can be transparent: the inner-pair $13_i$, the middle-pair $13_m$, and the outer-pair $13_o$.

Wire Grid Polarizer of FIGS. 20-21

WGPs 200 and 210 of FIGS. 20-21 can be made by applying the second-layer $L_2$ then the third-layer $L_3$ without an intermediate etch, as is shown in FIG. 18. As a result, a thickness $Th_i$ of wires 13 of the inner-pair $13_i$ can be greater than a thickness $Th_o$ of wires 13 of the outer-pair $13_o$. This structure can be useful for improving WGP performance. Other than this difference in thickness ($Th_o$ compared to $Th_i$), WGPs 200 and 210 can be similar to WGPs 100, 110, 120, 130, 140, 150, 160, and 170 described above. Thus, the above description of WGPs 100, 110, 120, 130, 140, 150, 160, and 170 applies to WGPs 200 and 210.

Wire Grid Polarizer of FIGS. 23-24

WGPs 230 and 240 of FIGS. 23-24 can be made by etching into the substrate 11 after etching horizontal segments H of the first-layer $L_1$, as shown in FIG. 22. The process can then continue from FIG. 5 onward. As a result of etching into the substrate 11 after etching horizontal segments H of the first-layer $L_1$, a thickness $Th_i$ of wires 13 of the inner-pair $13_i$ can be less than a thickness $Th_o$ of wires 13 of the outer-pair $13_o$. This structure can be useful for improving WGP performance. Other than this difference in thickness ($Th_o$ compared to $Th_i$), WGPs 230 and 240 can be similar to WGPs 100, 110, 120, 130, 140, 150, 160, and 170 described above. Thus, the above description of WGPs 100, 110, 120, 130, 140, 150, 160, and 170 applies to WGPs 200 and 210.

Wire Grid Polarizer of FIG. 29

As shown in FIG. 29, the wires 13 of WGP 290 also include a second-outer-pair $13_{o2}$. Each wire 13 of the second-outer-pair $13_{o2}$ can be laterally oriented with respect to one another, to the inner-pair $13_i$, and to the outer-pair $13_o$. The second-outer-pair $13_{o2}$ can sandwich the inner-pair $13_i$ and the outer-pair $13_o$. Each wire 13 of the second-outer-pair $13_{o2}$ can be separated from the other wire 13 of the second-outer-pair $13_{o2}$ by wires 13 of the outer-pair $13_o$, wires 13 of the inner-pair $13_i$, and the center-gap $G_c$.

Other than the additional second-outer-pair $13_{o2}$, WGP 290 is similar to WGPs 100, 110, 120, 130, 140, 150, 160, 170, 200, 210, 230, and 240 described above. Thus, the above description of WGPs 100, 110, 120, 130, 140, 150, 160, 170, 200, 210, 230, and 240 applies to WGP 290.

The fifth-layer $L_5$ and the sixth-layer $L_5$ can be made of different materials from each other and from one or more of the first-layer $L_1$, the second-layer $L_2$, and the third-layer $L_3$. The second-middle-pair $13_{m2}$ (see FIG. 28) and/or the second-outer-pair $13_{o2}$ can have a different chemical composition from each other and from one or more of the inner-pair $13_i$, the middle-pair $13_m$, and the outer-pair $13_o$.

At least one of the following can be reflective, at least one of the following can be absorptive, and at least one of the following can be transparent: the inner-pair $13_i$, the middle-pair $13_m$, the second-middle-pair $13_{m2}$, the outer-pair $13_o$, and the second-outer-pair $13_{o2}$. In one aspect, the middle-pair $13_m$ and the second-middle-pair $13_{m2}$ can be transparent.

What is claimed is:

1. A method of making a wire grid polarizer (WGP), the method comprising the following steps:
   providing an array of parallel, elongated support ribs located over a transparent substrate and spaces between the support ribs, the spaces being solid-material-free;
   conformal coating the substrate and the support ribs with a first-layer while maintaining solid-material-free at least a portion of the spaces between the support ribs;
   etching the first-layer to remove horizontal segments and leaving an array of inner-pairs of parallel, elongated wires along sides of the support ribs, each wire of each inner-pair being separate from the other wire of the inner-pair;
   conformal coating the substrate and the support ribs with a second-layer while maintaining solid-material-free at least a portion of the spaces between the support ribs;
   etching the second-layer to remove horizontal segments and leaving middle-pairs, the middle-pairs being an array of parallel, elongated wires, each wire of each middle-pair being separated from the other wire of the middle-pair by wires of the inner-pair;
   conformal coating the substrate and the support ribs with a third-layer while maintaining solid-material-free at least a portion of the spaces between the support ribs;
   etching the third-layer to remove horizontal segments and leaving outer-pairs, the outer-pairs being an array of parallel, elongated wires along sides of the support ribs, each wire of each outer-pair being: spaced apart with respect to the other wire of the outer-pair; and spaced apart with respect to wires of the inner-pair by wires of a middle-pair, the wires of the middle-pair being formed of material of the second-layer;
   filling spaces between the support ribs with a solid material; and
   etching the solid material, the support ribs, and the middle-pair to form: lateral-solid-material-free-regions between at least a portion of each wire of each outer-pair and at least a portion of an adjacent wire of the inner-pair; and center-solid-material-free-regions between at least a portion of the two wires of each inner-pair.

2. The method of claim 1, wherein the middle-pair and the solid material are both made of the same material.

3. The method of claim 1, wherein etching the support ribs, the middle-pair, and the solid material include:
   etching through the support ribs then into the transparent substrate between the two wires of each inner-pair;
   etching away completely the middle-pair and continuing to etch into the transparent substrate between each wire of each outer-pair an adjacent wire of the inner-pair; and
   etching the solid material and continuing to etch into the transparent substrate.

4. The method of claim 1, wherein the center-solid-material-free-regions extend from a distal-end, farther from the transparent substrate, to a proximal-end, closer to the transparent substrate, of an adjacent wire of the inner-pair, and extend beyond the proximal-end into the transparent substrate for a distance of at least 10% of a thickness of the adjacent wire of the inner-pair.

5. The method of claim 1, wherein the center-solid-material-free-regions extend for 70% to 98% of a distance from a distal-end, farther from the transparent substrate, towards a proximal-end, closer to the transparent substrate, of an adjacent wire of the inner-pair.

6. The method of claim 1, further comprising etching the transparent substrate between adjacent support ribs, forming base-ribs, each base-rib having one of the inner-pairs and one of the outer-pairs thereon.

7. The method of claim 1, further comprising etching the transparent substrate between adjacent support ribs, forming base-ribs, each base-rib having one of the inner-pairs and one of the outer-pairs thereon, and forming a solid-material-free space between adjacent base-ribs, each solid-material-free space:
   extending from a distal-end, farther from the transparent substrate, towards a proximal-end, closer to the transparent substrate, of an adjacent wire of the outer-pair; and
   extending beyond the proximal-end into the transparent substrate for a distance of at least 15% of a thickness of the adjacent wire of the outer-pair.

8. The method of claim 1, wherein the lateral-solid-material-free-regions extend for at least 80% of a distance from a distal-end, farther from the transparent substrate, towards a proximal-end, closer to the transparent substrate, of an adjacent wire of the inner-pair.

9. The method of claim 1, wherein the lateral-solid-material-free-regions extend for 70% to 98% of a distance from a distal-end, farther from the transparent substrate, towards a proximal-end, closer to the transparent substrate, of an adjacent wire of the inner-pair.

10. The method of claim 1, wherein etching the support ribs includes forming the center-solid-material-free-region from a distal-end of the inner-pair farthest from the transparent substrate to a proximal-end of the inner-pair closest to the transparent substrate.

11. The method of claim 1, wherein one of the first-layer or the third-layer is reflective and the other of the first-layer or the third-layer is absorptive.

12. The method of claim 11, wherein the second-layer is transparent.

13. The method of claim 1, wherein the second-layer is made of a different material than the first-layer and the third-layer is made of a different material than the first-layer or the second-layer.

14. A method of making a wire grid polarizer (WGP), the method comprising the following steps:

providing an array of parallel, elongated support ribs located over a transparent substrate and spaces between the support ribs, the spaces being solid-material-free;

conformal coating the substrate and the support ribs with a first-layer while maintaining solid-material-free at least a portion of the spaces between the support ribs;

etching the first-layer to remove horizontal segments and leaving an array of inner-pairs of parallel, elongated wires along sides of the support ribs, each wire of each inner-pair being separate from the other wire of the inner-pair, and using the inner-pair as a mask and etching into the substrate;

conformal coating the substrate and the support ribs with a second-layer while maintaining solid-material-free at least a portion of the spaces between the support ribs;

etching the second-layer to remove horizontal segments and leaving middle-pairs, the middle-pairs being an array of parallel, elongated wires, each wire of each middle-pair being separated from the other wire of the middle-pair by wires of the inner-pair;

conformal coating the substrate and the support ribs with a third-layer while maintaining solid-material-free at least a portion of the spaces between the support ribs;

etching the third-layer to remove horizontal segments and leaving outer-pairs, the outer-pairs being an array of parallel, elongated wires along sides of the support ribs, each wire of each outer-pair being: spaced apart with respect to the other wire of the outer-pair; and spaced apart with respect to wires of the inner-pair by wires of a middle-pair, the wires of the middle-pair being formed of material of the second-layer; and etching the support ribs and the middle-pair to form: lateral-solid-material-free-regions between at least a portion of each wire of each outer-pair and at least a portion of an adjacent wire of the inner-pair; and center-solid-material-free-regions between at least a portion of the two wires of each inner-pair.

15. The method of claim 14, wherein an order of the steps is: providing the array of parallel, elongated support ribs; conformal coating the substrate and the support ribs with the first-layer; conformal coating the substrate and the support ribs with the second-layer; conformal coating the substrate and the support ribs with the third-layer; etching the third-layer; etching the second-layer; etching the first-layer; then etching the support ribs and the middle-pair.

16. The method of claim 14, wherein an order of the steps is: providing the array of parallel, elongated support ribs; conformal coating the substrate and the support ribs with the first-layer; etching the first-layer; conformal coating the substrate and the support ribs with the second-layer; conformal coating the substrate and the support ribs with the third-layer; etching the third-layer; etching the second-layer; then etching the support ribs and the middle-pair.

17. The method of claim 14, wherein an order of the steps is: providing the array of parallel, elongated support ribs; conformal coating the substrate and the support ribs with the first-layer; etching the first-layer; conformal coating the substrate and the support ribs with the second-layer; etching the second-layer; conformal coating the substrate and the support ribs with the third-layer; etching the third-layer; then etching the support ribs and the middle-pair.

18. The method of claim 14, wherein the second-layer is made of a different material than the first-layer and the third-layer is made of a different material than the first-layer or the second-layer.

19. The method of claim 14, wherein etching into the substrate includes etching between adjacent support ribs, forming base-ribs, each base-rib having one of the inner-pairs and one of the outer-pairs thereon.

20. The method of claim 14, wherein one of the first-layer or the third-layer is reflective and the other of the first-layer or the third-layer is absorptive, and the second-layer is transparent.

* * * * *